(12) United States Patent
Kim (10) Patent No.: US 11,322,740 B2
(45) Date of Patent: May 3, 2022

(54) COMPOSITE ELECTROLYTE FOR SECONDARY BATTERY, HAVING MULTI-LAYER STRUCTURE

(71) Applicant: SEVEN KING ENERGY CO., LTD., Seongnam-si (KR)

(72) Inventor: Jae-Kwang Kim, Changwon-si (KR)

(73) Assignee: SEVEN KING ENERGY CO., LTD., Seongnam-si (KR)

( * ) Notice: Subject to any disclaimer, the term of this patent is extended or adjusted under 35 U.S.C. 154(b) by 462 days.

(21) Appl. No.: 16/087,830

(22) PCT Filed: Nov. 14, 2016

(86) PCT No.: PCT/KR2016/013063
§ 371 (c)(1),
(2) Date: Sep. 24, 2018

(87) PCT Pub. No.: WO2017/171187
PCT Pub. Date: Oct. 5, 2017

(65) Prior Publication Data
US 2020/0303729 A1    Sep. 24, 2020

(30) Foreign Application Priority Data

Mar. 28, 2016    (KR) .................... 10-2016-0036894

(51) Int. Cl.
| | | |
|---|---|---|
| *H01M 4/131* | (2010.01) | |
| *H01M 4/36* | (2006.01) | |
| *H01M 10/0525* | (2010.01) | |
| *H01M 10/0565* | (2010.01) | |
| *H01M 10/0569* | (2010.01) | |

(52) U.S. Cl.
CPC ........... *H01M 4/366* (2013.01); *H01M 4/131* (2013.01); *H01M 10/0525* (2013.01); *H01M 10/0565* (2013.01); *H01M 10/0569* (2013.01)

(58) Field of Classification Search
CPC .. H01M 4/366; H01M 4/131; H01M 10/0525; H01M 10/0565; H01M 10/0569; H01M 10/0562; H01M 10/056; H01M 2300/0082; H01M 2300/0071; Y02P 70/50; Y02E 60/10
See application file for complete search history.

(56) References Cited

U.S. PATENT DOCUMENTS

| | | | |
|---|---|---|---|
| 2010/0151335 A1 | 6/2010 | Senga | |
| 2012/0129045 A1* | 5/2012 | Gin ................... | H01M 10/0566 429/189 |
| 2014/0154586 A1 | 6/2014 | Hayashi | |
| 2014/0170503 A1* | 6/2014 | Yushin ............... | H01M 10/0525 429/306 |
| 2015/0010804 A1* | 1/2015 | Laramie ................ | H01M 4/382 429/144 |
| 2016/0013463 A1* | 1/2016 | Roumi ................ | H01M 10/052 429/145 |
| 2016/0028114 A1* | 1/2016 | Pratt ....................... | H01M 4/62 429/309 |

FOREIGN PATENT DOCUMENTS

| | | |
|---|---|---|
| CN | 1925203 A | 3/2007 |
| CN | 101124693 A | 2/2008 |
| CN | 102947972 A | 2/2013 |
| CN | 103094611 A | 5/2013 |
| CN | 103098288 A | 5/2013 |
| CN | 103456991 A | 12/2013 |
| CN | 104617255 A | 5/2015 |
| CN | 105390743 A | 3/2016 |
| EP | 1049188 A1 | 11/2000 |
| JP | 09505932 A | 6/1997 |
| JP | 2001351615 A | 12/2001 |
| JP | 2004-247317 A | 9/2004 |
| JP | 2007-066703 A | 3/2007 |
| JP | 2008-529209 A | 7/2008 |
| JP | 2008-243736 A | 10/2008 |
| JP | 2013-214494 A | 10/2013 |
| JP | 2014-110149 A | 6/2014 |
| JP | 2014-517490 A | 7/2014 |
| JP | 2014-216131 A | 11/2014 |
| JP | 5930035 B2 | 6/2016 |
| KR | 2001-0066272 A | 7/2001 |
| KR | 1020010066272 A | 7/2001 |
| KR | 2002-0085942 A | 11/2002 |
| KR | 1020020085842 A | 11/2002 |
| KR | 10-0368438 B1 | 1/2003 |
| KR | 1020030019385 A | 3/2003 |

(Continued)

OTHER PUBLICATIONS

PCT International Search Report of PCT/KR2016/013063.

(Continued)

*Primary Examiner* — Muhammad S Siddiquee
(74) *Attorney, Agent, or Firm* — Insight Law Group, PLLC; Seung Lee (57) ABSTRACT

The present invention relates to a composite electrolyte for a secondary battery, having a multi-layer structure, the composite electrolyte comprising: a first electrolyte layer positioned toward a cathode part; and a second electrolyte layer positioned toward an anode part, wherein each of the first electrolyte layer and the second electrolyte layer comprises a polymer base and ceramic particles, and the first electrolyte layer and the second electrolyte layer are formed of different materials.

10 Claims, 7 Drawing Sheets

(56) References Cited

FOREIGN PATENT DOCUMENTS

| KR | 1020070011443 A | 1/2007 |
|---|---|---|
| KR | 1020130111833 A | 10/2013 |
| KR | 101387855 B1 | 4/2014 |
| KR | 1020150018559 A | 2/2015 |
| WO | 2011/065388 A1 | 4/2013 |
| WO | 2013/137224 A1 | 8/2015 |

OTHER PUBLICATIONS

PCT Written Opinion of PCT/KR2016/013063, dated Feb. 17, 2017.
Extended search report dated Aug. 22, 2019 from the European Patent Office for European Application No. 16897207.3.
Japanese Office Action dated Jan. 5, 2021 from the Japanese Patent Office for Japanese Application No. 2018-550591.
Chinese Office Action dated May 28, 2021 from the Chinese Patent Office for Chinese Application No. 201680083921.6.
Chinese Office Action dated Nov. 19, 2021 from the Chinese Patent Office for Chinese Application No. 201680083921.6.

\* cited by examiner

COMPOSITE ELECTROLYTE FOR SECONDARY BATTERY, HAVING MULTI-LAYER STRUCTURE

CROSS-REFERENCE TO RELATED APPLICATION

This application is the National Stage of International Application No. PCT/KR2016/013063 filed on Nov. 14, 2016, which claims the benefit of and priority to Korean Patent Application No, 10-2016-0036894 filed on Mar. 28, 2016, which are herein incorporated by reference in its entirety.

TECHNICAL FIELD

The present invention relates to a composite electrolyte for a secondary battery, and more particularly, to a composite electrolyte for a secondary battery, having a multi-layer structure, in which the composite electrolyte is configured to have a multi-layer including two or more layers, thereby improving stability and electrochemical characteristics.

BACKGROUND ART

The application fields of a secondary battery that can be charged and discharged have been expanding from portable devices such as mobile phones, laptop computers, and camcorders to electric vehicles day by day, and accordingly, the secondary battery has been actively developed. Further, research and development on the design of the secondary battery have also been conducted in order to improve the capacity density and the specific energy at the time of developing the secondary battery.

In general, the secondary battery is composed of a cathode part, an anode part, and an electrolyte and a polymer separator positioned therebetween.

In particular, as an electrolyte for an electrochemical device in the prior art, a liquid-state electrolyte, particularly, an ion-conductive organic liquid electrolyte in which a salt is dissolved in a non-aqueous organic solvent has been mainly used. However, the liquid-state electrolyte has a problem in that the flammability and low thermal stability of the liquid-state electrolyte degrade the stability of the lithium secondary battery.

In order to solve the problem and improve the stability of a lithium secondary battery, various electrolytes such as a ceramic solid electrolyte and a polymer electrolyte have been developed.

However, the ceramic solid electrolyte and the polymer electrolyte have low ion conductivity at room temperature and low interface resistance characteristics with electrodes, and thus have another problem of making electrochemical characteristics of a secondary battery deteriorate.

In order to solve the problem, there have been attempts to manufacture a composite electrolyte by mixing ceramic particles with a polymer and manufacture a solid-phase composite electrolyte by including a small amount of a liquid electrolyte in the composite electrolyte.

The thus manufactured composite electrolyte increases thermal stability, and further, decreases the interface resistance, and the composite electrolyte includes a lithium ion-activated ceramic and thus increases electrochemical characteristics by improving the transfer of lithium ions.

However, since a ceramic and a polymer used in a composite electrolyte have different characteristics in a cathode part and an anode part of a secondary battery according to the types of ceramic and polymer, there is a limitation in improving stability and electrochemical characteristics.

As a prior art document related to the present invention, there is Korean Patent Application Laid-Open No. 10-2013-0111833 (Oct. 11, 2013), and the prior art document discloses an electrolyte for a lithium ion secondary battery, having a multi-layer structure, the lithium ion secondary battery including a cathode and an anode.

PROBLEMS TO BE SOLVED

An object of the present invention is to provide a composite electrolyte for a secondary battery, which can simultaneously satisfy characteristics of a cathode part and an anode part as an electrolyte layer positioned toward the cathode part and an electrolyte layer positioned toward the anode part are formed of different materials and laminated as a multi-layer structure.

TECHNICAL SOLUTION

A composite electrolyte for a secondary battery, having a multi-layer structure, according to the present invention is a composite electrolyte for a secondary battery, and the composite electrolyte includes: a first electrolyte layer positioned toward a cathode part; and a second electrolyte layer positioned toward an anode part, in which each of the first electrolyte layer and the second electrolyte layer includes a polymer base and ceramic particles, and the first electrolyte layer and the second electrolyte layer are formed of different materials.

Further, the composite electrolyte for a secondary battery, having a multi-layer structure, according to the present invention includes a third electrolyte layer positioned between the first electrolyte layer and the second electrolyte layer, in which the third electrolyte layer includes a polymer base and ceramic particles.

In addition, the composite electrolyte for a secondary battery according to the present invention additionally includes a liquid electrolyte.

Furthermore, the first electrolyte layer according to the present invention has relatively better electrochemical stability at the cathode part as compared to the second electrolyte layer, and the second electrolyte layer has relatively better electrochemical stability at the anode part as compared to the first electrolyte layer.

Further, each of the first electrolyte layer and the second electrolyte layer according to the present invention includes a different polymer base.

In addition, the polymer base according to the present invention includes one or more selected from the group consisting of a polyvinylidene fluoride-based polymer, a polyethylene glycol-based polymer, a polyacrylonitrile-based polymer, a polymethylmethacrylate-based polymer, a polyvinyl chloride-based polymer, a polyvinylpyrrolidone-based polymer, a polyimide-based polymer, a polyethylene-based polymer, a polyurethane-based polymer, a polypropylene-based polymer, a polypropylene oxide-based polymer, a polyethylene imine-based polymer, a polyethylene sulfide-based polymer, a polyvinyl acetate-based polymer, a polyethylenesuccinate-based polymer, a polyester-based polymer, a polyamine-based polymer, a polysulfide-based polymer, a siloxane-based polymer, derivatives thereof, and combinations thereof.

Furthermore, each of the first electrolyte layer and the second electrolyte layer according to the present invention includes different ceramic particles.

Further, the ceramic particles according to the present invention include one or more selected from the group consisting of $Al_2O_3$-based ceramic particles, $SiO_2$-based ceramic particles, $BaTiO_3$-based ceramic particles, $TiO_2$-based ceramic particles, lithium oxide-based ceramic particles, lithium sulfide-based ceramic particles, an amorphous ion conductive material, NASICON, sodium sulfide-based ceramic particles, sodium oxide-based ceramic particles, derivatives thereof, and combinations thereof.

ADVANTAGEOUS EFFECTS

In order to improve the stability of a secondary battery in the prior art, a solid-phase electrolyte was manufactured of only a polymer or a ceramic, a ceramic-polymer composite electrolyte was manufactured in only one layer. However, the polymer electrolyte has low ion conductivity at room temperature, the ceramic solid electrolyte has a large interface resistance with an electrode, and the ceramic-polymer composite electrolyte cannot simultaneously satisfy characteristics of a cathode and an anode of a secondary battery.

On the other hand, a composite electrolyte for a secondary battery, having a multi-layer structure, according to the present invention has high ion conductivity and has effects capable of reducing an interface resistance with an electrode and simultaneously satisfying characteristics of a cathode part and an anode part.

Further, the composite electrolyte has advantages in that the thermal stability is excellent, the capacity is excellent when the composite electrolyte is applied to a secondary battery, and as the charge-discharge cycle proceeds, the capacity is maintained without being significantly reduced.

BEST MODE

Hereinafter, preferred Examples according to the present invention will be described in detail with reference to the accompanying drawings.

The benefits and features of the present invention, and the methods of achieving the benefits and features will become apparent with reference to Examples to be described below in detail along with the accompanying drawings.

However, the present invention is not limited to the Examples to be disclosed below, but may be implemented in various other forms, and the present Examples are only provided for rendering the disclosure of the present invention complete and for fully representing the scope of the invention to a person with ordinary skill in the technical field to which the present invention pertains, and the present invention will be defined only by the scope of the claims.

Further, if the related prior art and the like may obscure the gist of the present invention in describing the present invention, the detailed description thereof will be omitted.

Figure 1:
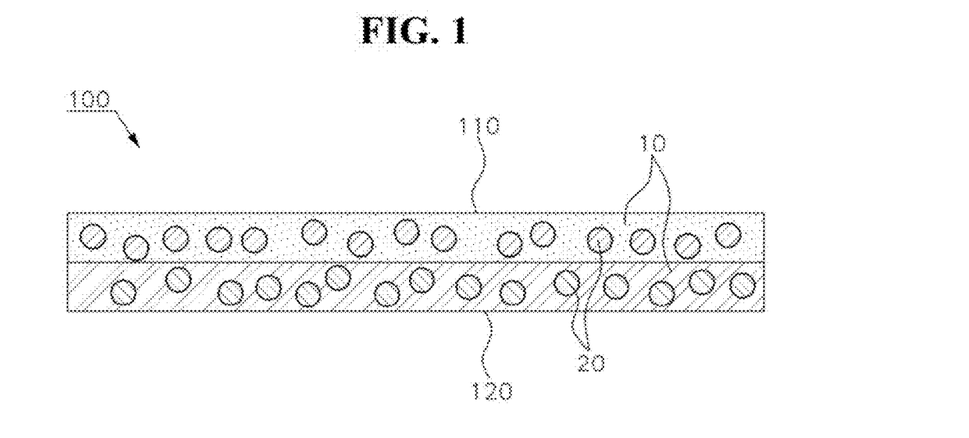
FIG. 1 is a view for schematically illustrating a cross-sectional structure of a composite electrolyte for a secondary battery, having a double-layer structure, according to the present invention.

FIG. 1 is a view for schematically illustrating a cross-sectional structure of a composite electrolyte for a secondary battery, having a double-layer structure, according to the present invention.

Referring to FIG. 1, a composite electrolyte 100 for a secondary battery, having a double-layer structure, according to the present invention is used in a secondary battery including a cathode part and an anode part, and includes a first electrolyte layer 110 positioned toward the cathode part and a second electrolyte layer 120 positioned toward the anode part.

In this case, each of the first electrolyte layer 110 and the second electrolyte layer 120 includes a polymer base 10 and ceramic particles 20 distributed in the polymer base 10, in which the first electrolyte layer 110 and the second electrolyte layer 120 are formed of different materials.

In general, the ceramic particles 20 and the polymer base 10 used in a composite electrolyte for a secondary battery have different characteristics in a cathode part and an anode part of a secondary battery according to the types of the ceramic particles 20 and the polymer base 10, so that there is a problem in that electrochemical characteristics deteriorate.

When a composite electrolyte having a single-layer structure is used, one electrolyte layer is brought into contact with a cathode part and an anode part, and the one electrolyte layer exhibits different characteristics in the cathode part and the anode part, so that there is limitation in improving the stability and electrochemical characteristics of a secondary battery.

On the other hand, the present invention intends to improve the stability and electrochemical characteristics of a secondary battery by complexing the different ceramic particles 20 and the different polymer bases 10, such that the electrolytes brought into contact with the cathode part and the anode part have different materials, thereby manufacturing a composite electrolyte having a multi-layer structure including two or more layers.

Figure 2:
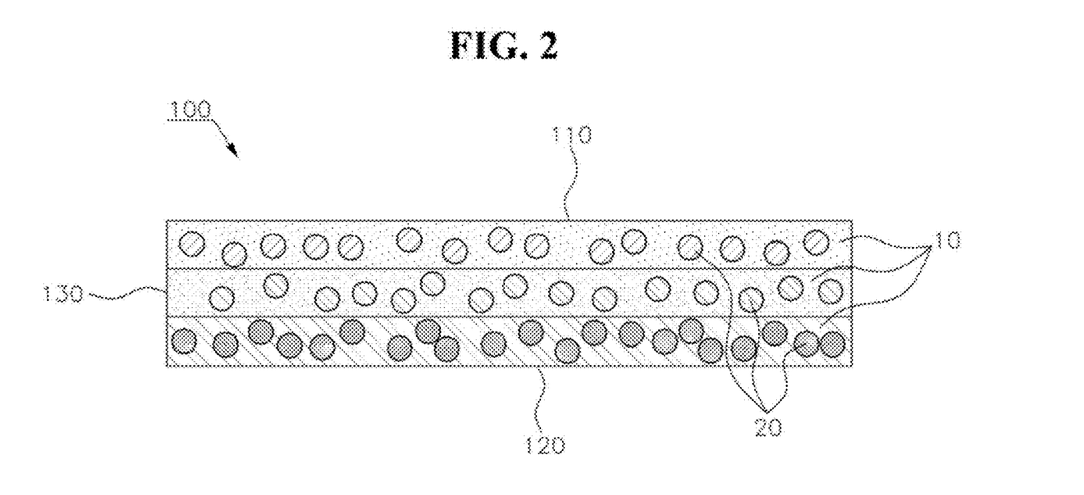
FIG. 2 is a view for schematically illustrating a cross-sectional structure of a composite electrolyte for a secondary battery, having a triple-layer structure, according to the present invention.

FIG. 2 is a view for schematically illustrating a cross-sectional structure of a composite electrolyte for a secondary battery, having a triple-layer structure, according to the present invention.

Referring to FIG. 2, the composite electrolyte 100 for a secondary battery, having a multi-layer structure, according to the present invention is used in a secondary battery including a cathode part and an anode part, and the composite electrolyte 100 includes the first electrolyte layer 110 positioned toward the cathode part and the second electrolyte layer 120 positioned toward the anode part, and further includes a third electrolyte layer 130 positioned between the first electrolyte layer 110 and the second electrolyte layer 120.

Each of the electrolyte layers includes the polymer base 10 and the ceramic particles 20 distributed in the polymer base 10, in which the first electrolyte layer 110 positioned toward the cathode part and the second electrolyte layer 120 positioned toward the anode part are formed of different materials.

In this case, it is preferred that the first electrolyte layer 110 has relatively better electrochemical stability at the cathode part as compared to the second electrolyte layer 120, and the second electrolyte layer 120 has relatively better electrochemical stability at the anode part as compared to the first electrolyte layer 110.

In addition, it is possible to further improve electrochemical characteristics of a secondary battery by complexing various ceramic characteristics through the third electrolyte layer 130.

In order to realize characteristics of a secondary battery to be used or characteristics of a desired composite electrolyte in addition to the aforementioned structures, it is possible to add a plurality of electrolyte layers between the first electrolyte layer 110 and the second electrolyte layer 120, and accordingly, it is possible to realize a composite electrolyte for a secondary battery, having a multi-layer structure. The multi-layer structure may include both the double-layer structure and the triple-layer structure described above.

In order to manufacture the aforementioned multi-layer structure, it is possible to use a typically known manufacturing method such as a printing method, a doctor blade method, a phase separation method, an electrospinning method, an extraction method, and a compression method.

The composite electrolyte for a secondary battery, having a multi-layer structure, according to the present invention may additionally include a small amount of a liquid electrolyte.

The liquid electrolyte may be a liquid electrolyte obtained by dissolving one or more lithium salts selected from the group consisting of $LiBF_4$, $LiClO_4$, $LiPF_6$, $LiSbF_6$, $LiAsF_6$, $Li(C_2F_5SO_3)_2N$, $LiCF_3SO_3$, $Li(CF_3SO_2)_2N$, $LiC_4FSO$, $Li(CF_3SO_2)_3C$, $LiBPh_4$, $LiAlO_4$, $LiAlCl_4$, $LiSCN$, and $LiC(CF_3SO_2)_3$ in a cyclic carbonate-based organic solvent such as ethylene carbonate, propylene carbonate, 1,2-butylene carbonate, 2,3-butylene carbonate, and 2,3-pentylene carbonate and a linear carbonate-based organic solvent such as dimethyl carbonate, diethyl carbonate, ethylmethyl carbonate, 1,2-dimethoxyethane, dipropyl carbonate, methylpropyl carbonate, and ethylpropyl carbonate, but is not limited thereto, and may include all types of liquid electrolytes typically used in the art.

It is preferred that the liquid electrolyte is included in an amount of 1 to 50 parts by weight based on 100 parts by weight of the total composite electrolyte, and the liquid electrolyte may be introduced into the composite electrolyte through an impregnation process.

As a method of impregnating a liquid electrolyte, it is also possible to use a method of impregnating a liquid electrolyte after each of the electrolyte layers is separately manufactured or a method of impregnating an entire composite electrolyte having a multi-layer structure.

The thus impregnated liquid electrolyte may decrease the interface resistance between an electrode and an electrolyte, and may also decrease the interface resistance between the ceramic particles 20 and the polymer base 10 in the composite electrolyte.

Each of the first electrolyte layer 110 and the second electrolyte layer 120 is not limited to include the same polymer base 10, but it is preferred that each of the first electrolyte layer 110 and the second electrolyte layer 120 includes the different polymer base 10.

Here, the polymer base 10 includes one or more selected from the group consisting of a polyvinylidene fluoride (PVdF)-based polymer, a polyethylene glycol (PEO)-based polymer, a polyacrylonitrile (PAN)-based polymer, a polymethylmethacrylate (PMMA)-based polymer, a polyvinyl chloride-based polymer, a polyvinylpyrrolidone (PVP)-based polymer, a polyimide (PI)-based polymer, a polyethylene (PE)-based polymer, a polyurethane (PU)-based polymer, a polypropylene (PP)-based polymer, a polypropylene oxide (PPO)-based polymer, a polyethylene imine (PEI)-based polymer, a polyethylene sulfide (PES)-based polymer, a polyvinyl acetate (PVAc)-based polymer, a polyethylenesuccinate (PESc)-based polymer, a polyester-based polymer, a polyamine-based polymer, a polysulfide-based polymer, a siloxane-based polymer, derivatives thereof, and combinations thereof.

Furthermore, it is preferred that each of the first electrolyte layer 110 and the second electrolyte layer 120 includes the different ceramic particles 20.

Here, the ceramic particles 20 include one or more selected from the group consisting of $Al_2O_3$-based ceramic particles, $SiO_2$-based ceramic particles, $BaTiO_3$-based ceramic particles, $TiO_2$-based ceramic particles, lithium oxide-based ceramic particles, lithium sulfide-based ceramic particles, an amorphous ion conductive material. NASICON, sodium sulfide-based ceramic particles, sodium oxide-based ceramic particles, derivatives thereof, and combinations thereof.

In this case, the lithium oxide-based ceramic particles may include $Li_{1.3}Al_{0.3}Ti_{1.7}(PO_4)_3$ (LTAP), $Li_7La_3Zr_2O_{12}$ (LLZO), or the like, the lithium sulfide-based ceramic particles may include $Li_{10}GeP_2S_{12}$, $Li_2S$—$P_2S_5$, or the like, and the amorphous ion conductive material may include phosphorus-based glass, oxide-based glass, oxide/sulfide-based glass, or the like.

A polyethylene glycol (PEO)-based polymer is stable at the side of the anode part, but instable at the side of the cathode part, and a $Li_{1.3}Al_{0.3}Ti_{1.7}(PO_4)_3$ (LTAP) ceramic solid electrolyte has a problem in that an anode with a low voltage, such as graphite, Si, and Li, cannot be used due to the high reduction potential of Ti, but may increase electrochemical characteristics of a composite electrolyte due to the excellent lithium ion activity.

For example, the first electrolyte layer 110 according to the present invention may be complexed by using polyvinylidene fluoride (PVdF) having high electrochemical stability as the polymer base 10 and using LTAP as the ceramic particles 20, and the second electrolyte layer 120 according to the present invention may be complexed by using polyvinylidene fluoride (PVdF) having high electrochemical stability or a polyethylene glycol (PEO)-based polymer having high electrochemical stability at the anode part as the polymer base 10 and using LLZO or $Al_2O_3$, which is stable at low voltage, as the ceramic particles 20, but the complexing method is not limited thereto.

The third electrolyte layer 130 according to the present invention may be complexed by using a polyethylene glycol (PEO)-based polymer as the polymer base 10 and using lithium sulfide-based ceramic particles such as Li$_2$S—P$_2$S$_5$ as the ceramic particles 20, but the complexing method is not limited thereto.

Figure 3:
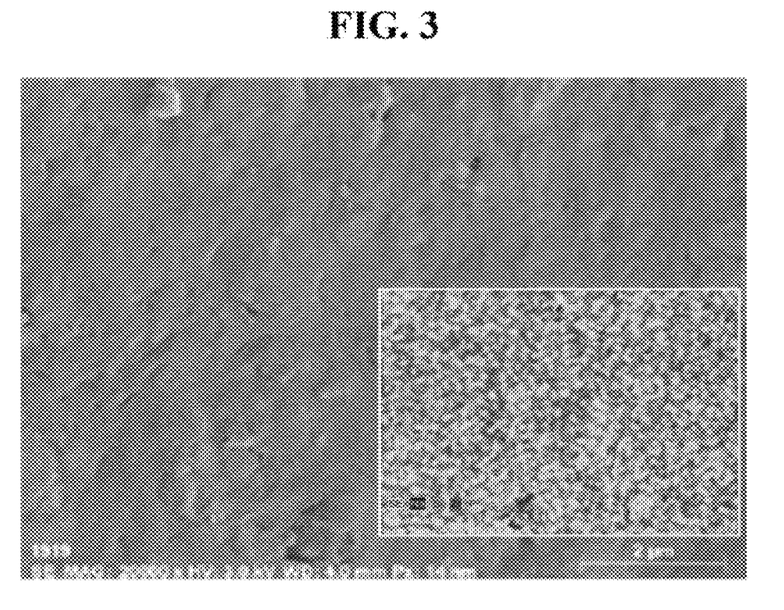
FIG. 3 is a SEM analysis photograph of a surface of a composite electrolyte for a secondary battery, having a multi-layer structure, according to the present invention.
Figure 4:
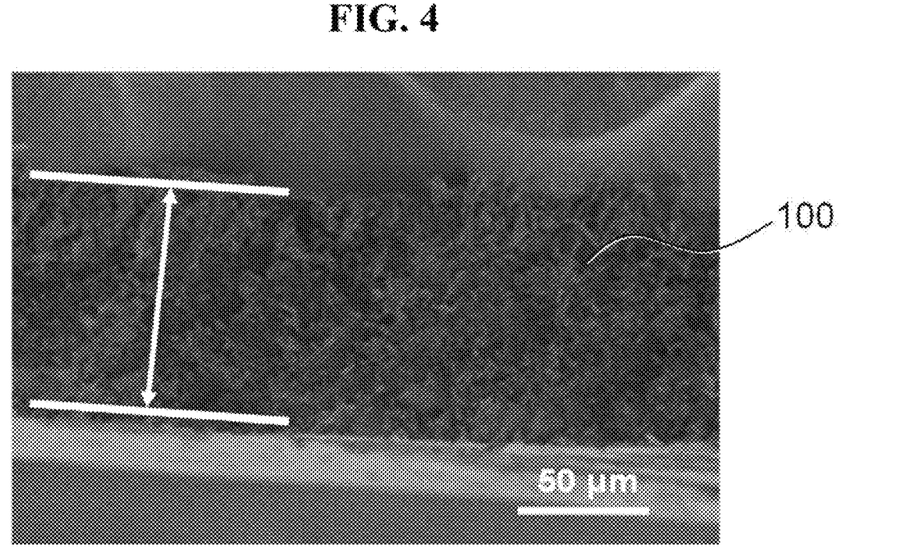
FIG. 4 is a SEM analysis photograph of a cross-section of the composite electrolyte for a secondary battery, having a multi-layer structure, according to the present invention.

FIG. 3 is a SEM analysis photograph of a surface of a composite electrolyte for a secondary battery, having a multi-layer structure, according to the present invention, and FIG. 4 is a SEM analysis photograph of a cross-section of the composite electrolyte for a secondary battery, having a multi-layer structure, according to the present invention.

Referring to FIGS. 3 and 4, it can be seen that in the composite electrolyte for a secondary battery, having a multi-layer structure, according to the present invention, the ceramic particles and the polymer base are mixed well, such that the surface thereof is formed very uniformly, and that the bond between the electrolyte layers is formed firmly.

Figure 5A:
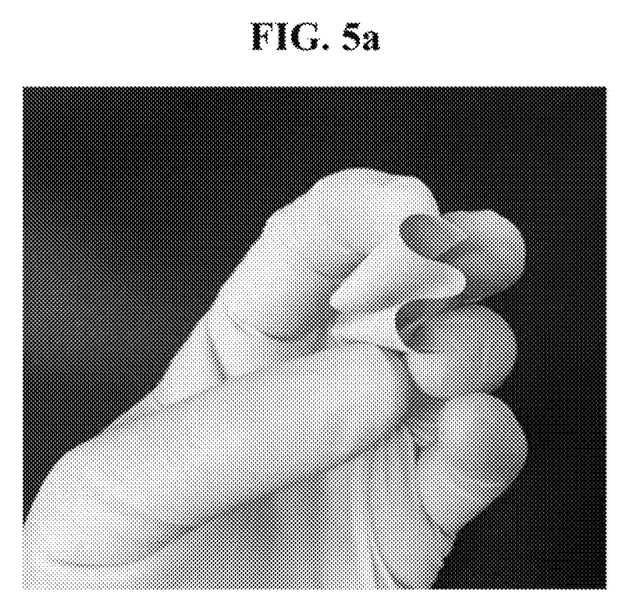
FIGS. 5A and 5B are views for illustrating deformation characteristics of the composite electrolyte for a secondary battery, having a multi-layer structure, according to the present invention.
Figure 5B:
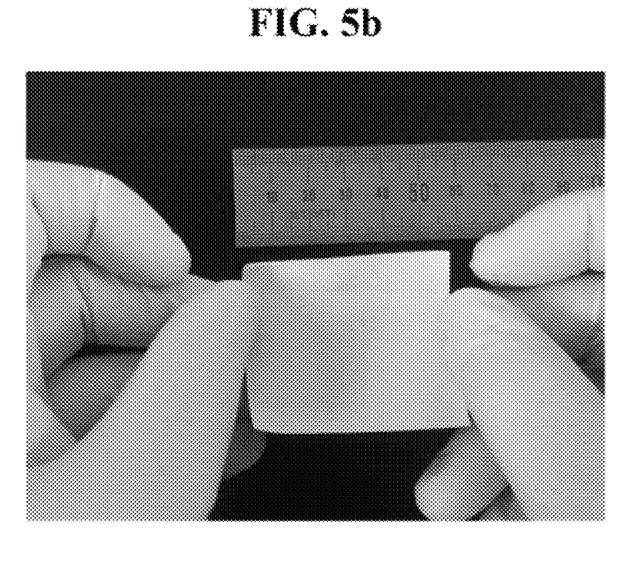

FIGS. 5A and 5B are views for illustrating deformation characteristics of the composite electrolyte for a secondary battery, having a multi-layer structure, according to the present invention, and as illustrated, it can be seen that the variability is very excellent.

Figure 6A:
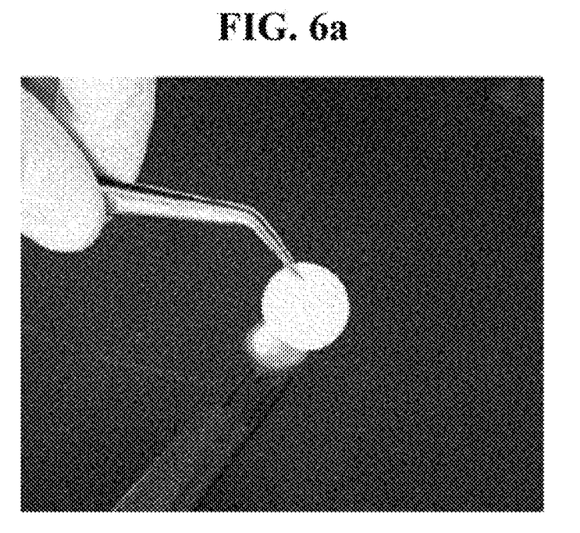
FIGS. 6A and 6B are photographs for testing the thermal stability of the composite electrolyte for a secondary battery, having a multi-layer structure, according to the present invention.
Figure 6B:
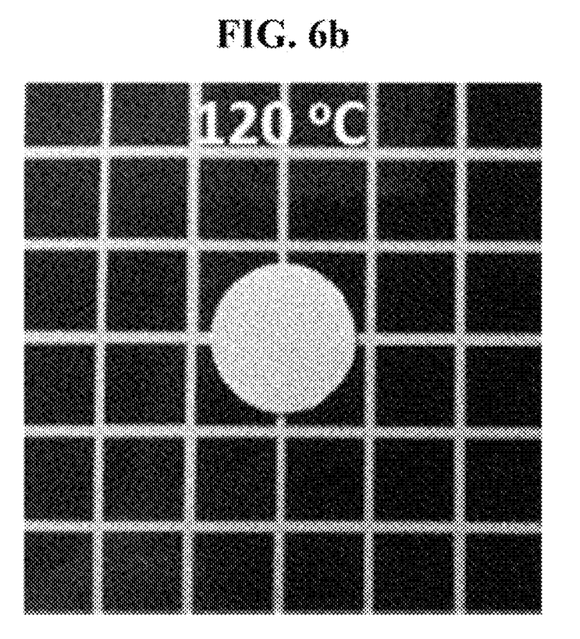
Figure 7A:
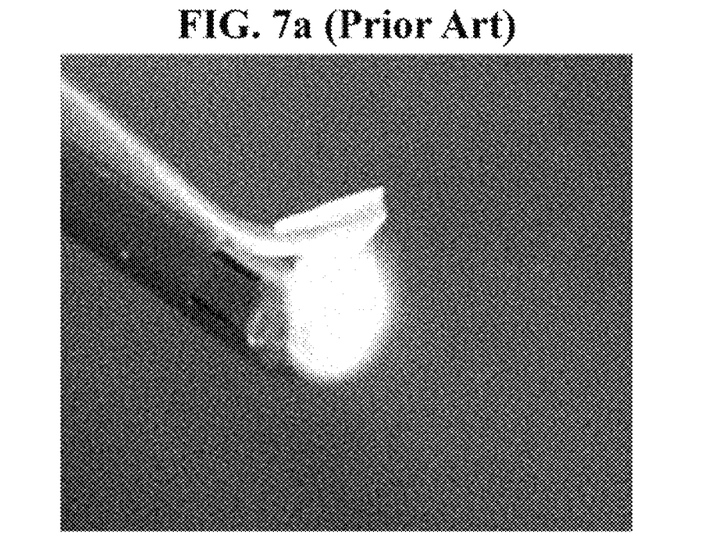
FIGS. 7A and 7B are photographs for testing the thermal stability of a commercially available separator for a secondary battery in the prior art.
Figure 7B:
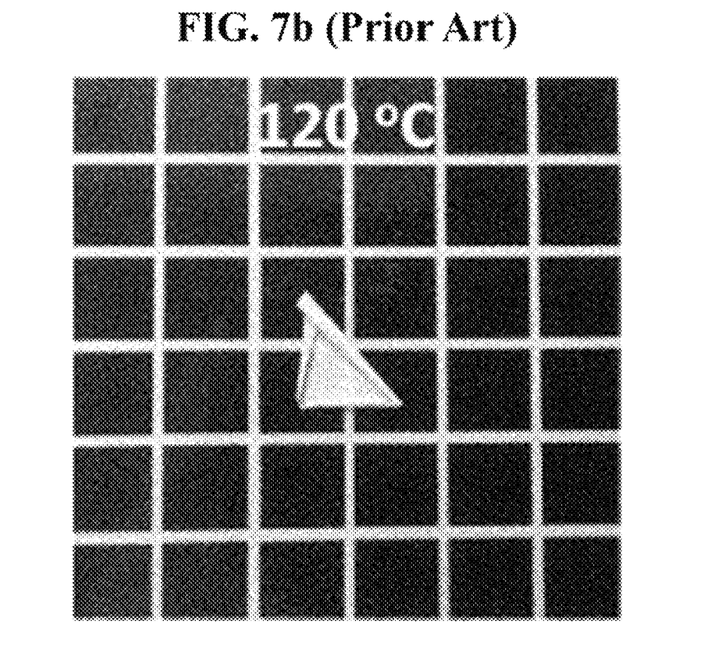

FIGS. 7A-7B are photographs for testing the thermal stability of a commercially available separator for a second battery in the prior art, and FIG. 6A, 6B is a photograph for testing the thermal stability of the composite electrolyte for a secondary battery, having a multi-layer structure, according to the present invention.

FIGS. 6A-6B and 7A-7B, it can be seen that the composite electrolyte for a secondary battery, having a multi-layer structure, according to the present invention has no flammability and exhibits excellent thermal stability in which the composite electrolyte does nor shrink even at 120.degree. C., whereas the commercially available separator is burnt well in fire and significantly shrinks at 120.degree. C.

Figure 8A:
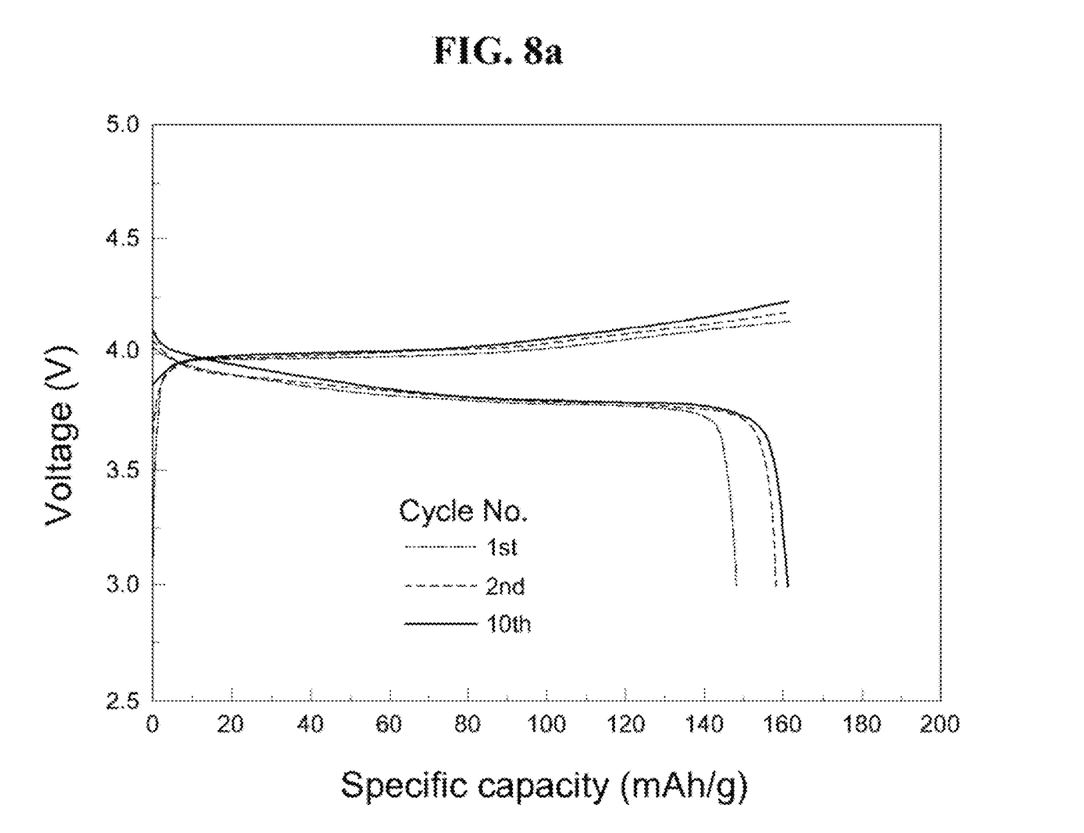
FIG. 8A is a charge-discharge curve of the composite electrolyte for a secondary battery, having a multi-layer structure, according to the present invention.
Figure 8B:
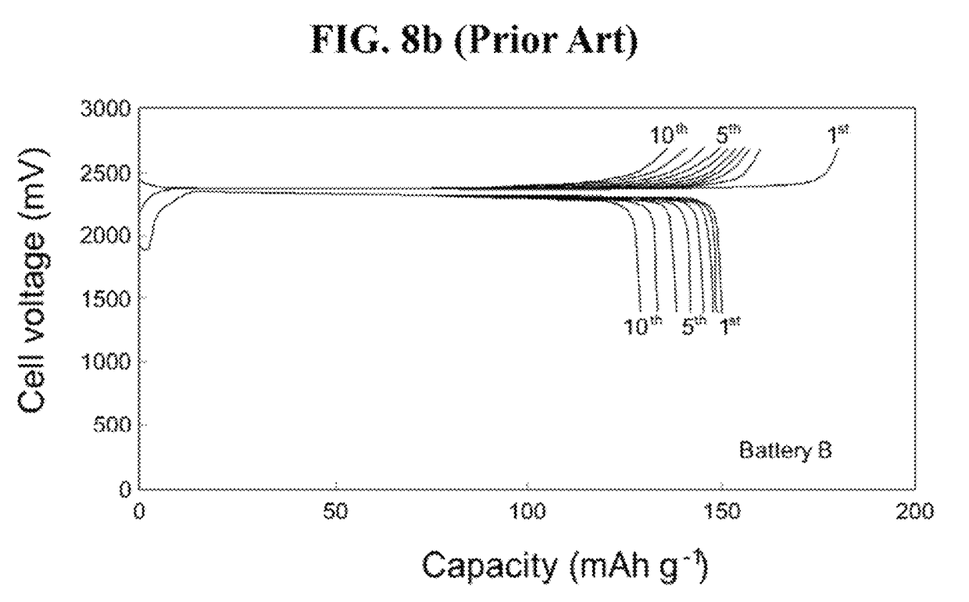
FIG. 8B is a charge-discharge curve of a composite electrolyte for a secondary battery in the prior art.

FIG. 8A is a charge-discharge curve of the composite electrolyte for a secondary battery, having a multi-layer structure, according to the present invention, and FIG. 8B is a charge-discharge curve of a composite electrolyte for a secondary battery in the prior art.

Here, in the composite electrolyte for a secondary battery, having a multi-layer structure, according to the present invention, which is illustrated in FIG. 8A, a first electrolyte layer positioned toward a cathode part was manufactured by mixing LTAP and PVdF at a weight rats of 80:20, and a second electrolyte layer positioned toward an anode part was manufactured by mixing LLZO and PVdF at a weight ratio of 80:20, and printing, phase separation, and doctor blade methods were used as a method of manufacturing a film. A liquid electrolyte corresponding to 10 parts by weight based on 100 parts by weight of the entire composite electrolyte was impregnated into the thus manufactured composite electrolyte.

In order to analyze electrochemical characteristics of a secondary battery in which a composite electrolyte was used, the secondary battery was charged-discharged at room temperature and a current density of 0.1 C by using LiCoO$_2$ as a cathode and using a Li metal having the lowest potential as an anode.

For the composite electrolyte for a secondary battery in the prior art illustrated in FIG. 7B, the composite electrolyte is composed of a single mixture having a triple-layer structure including PEO/LTAP/PEO.

As illustrated, it can be seen that the LiCoO$_2$ cathode exhibits a capacity of up to 170 mAh/g, but the composite electrolyte for a secondary battery, having a multi-layer structure, according to the present invention has a capacity of 160 mAh/g. The change in capacity is not significant even though the charge-discharge cycle is repeated, whereas in the composite electrolyte for a secondary battery in the prior art, the capacity is continuously decreased as the charge-discharge cycle is repeated. As a result, it can be seen that the electrochemical characteristics of the composite electrolyte for a secondary battery, having a multi-layer structure, according to the present invention are excellent.

Although the specific Examples of the composite electrolyte for a secondary battery according to the present invention have been described so far, it is obvious that various modifications can be made without departing from the scope of the present invention.

Therefore, the scope of the present invention should not be limited to the described Examples, and should be defined by not only the claims to be described below, but also those equivalent to the claims.

That is, it is to be understood that the above-described Examples are illustrative in all respects and are not limitative, the scope of the present invention is represented by the claims to be described below rather than the detailed description, and it is to be interpreted that all the changed or modified forms derived from the meaning and scope of the claims and the equivalent concept thereof are included in the scope of the present invention.

SEQUENCE LISTING FREE TEXT

None

What is claimed is:

1. A composite electrolyte for a secondary battery, having a multi-layer structure, the composite electrolyte comprising:
   a first electrolyte layer positioned toward a cathode part; and
   a second electrolyte layer positioned toward an anode part,
   wherein the first electrolyte layer comprises a first polymer base, first ion conductive ceramic particles, and a first liquid electrolyte,
   wherein the second electrolyte layer comprises a second polymer base, second ion conductive ceramic particles, and a second liquid electrolyte, and
   wherein the first electrolyte layer and the second electrolyte layer are formed of different materials from each other,
   wherein a sum of the first and the second liquid electrolytes included in the composite electrolyte is 1 to 50 parts by weight based on 100 parts by weight of the composite electrolyte.

2. The composite electrolyte according to claim 1, further comprising:
   a third electrolyte layer positioned between the first electrolyte layer and the second electrolyte layer,
   wherein the third electrolyte layer composes a third polymer base, third ion conductive ceramic particles, and a third liquid electrolyte,
   wherein a sum of the first, the second and the third liquid electrolytes included in the composite electrolyte is 1 to 50 parts by weight based on 100 parts by weight of the composite electrolyte.

3. The composite electrolyte according to claim 1, wherein the first polymer base is different from the second polymer base.

4. The composite electrolyte according to claim 3, wherein the first polymer base is selected from the group consisting of a polyvinylidene fluoride-based polymer, a polyethylene glycol-based polymer, a polyacrylonitrile-based polymer, a polymethylmethacrylate-based polymer, a polyvinyl chloride-based polymer, a polyvinylpyrrolidone-based polymer, a polyimide-based polymer, a polyethylene-based polymer, a polyurethane-based polymer, a polypropylene-based polymer, a polypropylene oxide-based polymer, a polyethylene imine-based polymer, a polyethylene sulfide-based polymer, a polyvinyl acetate-based polymer, a polyethylenesuccinate-based polymer, a polyester-based polymer, a polyamine-based polymer, a polysulfide-based polymer, a siloxane-based polymer, a derivative thereof, and a combination thereof, and wherein the second polymer base is selected from the group consisting of a polyvinylidene fluoride-based polymer, a polyethylene glycol-based polymer, a polyacrylonitrile-based polymer, a polymethylmethacrylate-based polymer, a polyvinyl chloride-based polymer, a polyvinylpyrrolidone-based polymer, a polyimide-based polymer, a polyethylene-based polymer, a polyurethane-based polymer, a polypropylene-based polymer, a polypropylene oxide-based polymer, a polyethylene imine-based polymer, a polyethylene sulfide-based polymer, a polyvinyl acetate-based polymer, a polyethylenesuccinate-based polymer, a polyester-based polymer, a polyamine-based polymer, a polysulfide-based polymer, a siloxane-based polymer, a derivative thereof, and a combination thereof.

5. The composite electrolyte according to claim 1,
wherein the first ion conductive ceramic particles are different from the second ion conductive ceramic particles.

6. The composite electrolyte according to claim 5,
wherein the first ion conductive ceramic particles are selected from the group consisting $Al_2O_3$-based ceramic particles, $SiO_2$-based ceramic particles, $BaTiO_3$-based ceramic particles, $TiO_2$-based ceramic particles, lithium, oxide-based ceramic particles, lithium sulfide-based ceramic particles, an amorphous ion conductive material, NASICON, sodium sulfide-based ceramic particles, sodium oxide-based ceramic particles, a derivative thereof, and a combination thereof, and wherein the second ion conductive ceramic particles are selected from the group consisting of $Al_2O_3$-based ceramic particles, $SiO_2$-based ceramic particles, $BaTiO_3$-based ceramic particles, $TiO_2$-based ceramic particles, lithium oxide-based ceramic particles, lithium sulfide-based ceramic particles, an amorphous ion conductive material, NASICON, sodium sulfide-based ceramic particles, sodium oxide-based ceramic particles, a derivative thereof, and a combination thereof.

7. The composite electrolyte according to claim 2,
wherein the first polymer base, the second polymer base, and the third polymer base are different from one another.

8. The composite electrolyte according to, claim 7,
wherein the first polymer base is selected from the group consisting of a polyvinylidene fluoride-based polymer, a polyethylene glycol-based polymer, a polyacrylonitrile-based polymer, a poly methylmethacrylate-based polymer, a polyvinyl chloride-based polymer, a polyvinylpyrrolidone-based polymer, a polyimide-based polymer, a polyethylene-based polymer, a polyurethane-based polymer, a polypropylene-based polymer, a polypropylene oxide-based polymer, a polyethylene imine-based polymer, a polyethylene sulfide-based polymer, a polyvinyl acetate-based polymer, a polyethylenesuccinate-based polymer, a polyester-based polymer, a polyamine-based polymer, a polysulfide-based polymer, a siloxane-based polymer, a derivative thereof, and a combination thereof, wherein the second polymer base is selected from the group consisting of a polyvinylidene fluoride-based polymer, a polyethylene glycol-based polymer, a polyacrylonitrile-based polymer, a polymethylmethacrylate-based polymer, a polyvinyl chloride-based polymer, a polyvinylpyrrolidone-based polymer, a polyimide-based polymer, a polyethylene-based polymer, a polyurethane-based polymer, a polypropylene-based polymer, a polypropylene oxide-based polymer, a polyethylene imine-based polymer, a polyethylene sulfide-based polymer, a polyvinyl acetate-based polymer, a polyethylenesuccinate-based polymer, a polyester-based polymer, a polyamine-based polymer, a polysulfide-based polymer, a siloxane-based polymer, a derivative thereof, and a combination thereof, and wherein the third polymer base is selected from the group consisting of a polyvinylidene fluoride-based polymer, a polyethylene glycol-based polymer, a polyacrylonitrile-based polymer, a polymethylmethacrylate-based polymer, a polyvinyl chloride-based polymer, a polyvinylpyrrolidone-based polymer, a polyimide-based polymer, a polyethylene-based polymer, a polyurethane-based polymer, a polypropylene-based polymer, a polypropylene oxide-based polymer, a polyethylene imine-based polymer, a polyethylene sulfide-based polymer, a polyvinyl acetate-based polymer, a polyethylenesuccinate-based polymer, a polyester-based polymer, a polyamine-based polymer, a polysulfide-based polymer, a siloxane-based polymer, a derivative thereof, and a combination thereof.

9. The composite electrolyte according to claim 2,
wherein the first ion conductive ceramic particles are different from the second ion conductive ceramic particles.

10. A composite electrolyte for a secondary battery, having a multi-layer structure, the composite electrolyte comprising:
a first electrolyte layer positioned toward a cathode part; and
a second electrolyte layer positioned toward an anode part,
wherein the first electrolyte layer comprises a first polymer base, first ion conductive ceramic particles, and a first liquid electrolyte,
wherein the second electrolyte layer comprises a second polymer base, second ion conductive ceramic particles, and a second liquid electrolyte, and
wherein the first electrolyte layer and the second electrolyte layer are formed of different materials from each other,
wherein a sum of the first and the second liquid electrolytes included in the composite electrolyte is 1 to 50 parts by weight based on 100 parts by weight of the composite electrolyte,
wherein the composite electrolyte further comprising a third electrolyte layer positioned between the first electrolyte layer and the second electrolyte layer,
wherein the third electrolyte layer comprises a third polymer base, third ion conductive ceramic particles, and a third liquid electrolyte, wherein a sum of the first, the second and the third liquid electrolytes included in the composite electrolyte is 1 to 50 parts by weight based on 100 parts by weight of the composite electrolyte, wherein the first ion conductive ceramic particles are different from the second ion conductive ceramic particles, wherein the first ion conductive ceramic particles are selected from the group consisting of $Al_2O_3$-based ceramic particles, $SiO_2$-based ceramic particles, $BaTiO_3$-based ceramic particles, $TiO_2$-based ceramic particles, lithium oxide-based ceramic particles, lithium sulfide-based ceramic particles, an amorphous ion conductive material, NASICON, sodium sulfide-based ceramic particles, sodium oxide-based ceramic particles, a derivative thereof, and a combination thereof, wherein the second ion conductive ceramic particles are selected from the group consisting of $Al_2O_3$-based ceramic particles, $SiO_2$-based ceramic particles, $BaTiO_3$-based ceramic particles, $TiO_2$-based ceramic particles, lithium oxide-based ceramic particles, lithium sulfide-based ceramic particles, an amorphous ion conductive material, NASICON, sodium sulfide-based ceramic particles, sodium oxide-based ceramic particles, a derivative thereof, and a combination thereof, and wherein the third ion conductive ceramic particles are selected from the group consisting of $Al_2O_3$-based ceramic particles, $SiO_2$-based ceramic particles, $BaTiO_3$-based ceramic particles, $TiO_2$-based ceramic particles, lithium oxide-based ceramic particles, lithium sulfide-based ceramic particles, an amorphous ion conductive material, NASICON, sodium sulfide-based ceramic particles, sodium oxide-based ceramic particles, a derivative thereof, and a combination thereof.

* * * * *